United States Patent
Kim et al.

(10) Patent No.: US 10,565,725 B2
(45) Date of Patent: Feb. 18, 2020

(54) METHOD AND DEVICE FOR DISPLAYING VIRTUAL OBJECT

(71) Applicant: SAMSUNG ELECTRONICS CO., LTD., Suwon-si (KR)

(72) Inventors: Seung-Chan Kim, Hwaseong-si (KR); Joonah Park, Seoul (KR); Du-Sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 15/440,603

(22) Filed: Feb. 23, 2017

(65) Prior Publication Data

US 2018/0108147 A1 Apr. 19, 2018

(30) Foreign Application Priority Data

Oct. 17, 2016 (KR) .................. 10-2016-0134213

(51) Int. Cl.
| | |
|---|---|
| *G06T 7/73* | (2017.01) |
| *G06F 3/01* | (2006.01) |
| *G06T 15/20* | (2011.01) |
| *G06F 3/0482* | (2013.01) |
| *G06T 7/246* | (2017.01) |

(Continued)

(52) U.S. Cl.
CPC .............. *G06T 7/74* (2017.01); *G06F 3/011* (2013.01); *G06F 3/0308* (2013.01); *G06F 3/0482* (2013.01); *G06T 7/246* (2017.01); *G06T 7/75* (2017.01); *G06T 11/60* (2013.01); *G06T 15/20* (2013.01); *G06T 19/006* (2013.01);

(Continued)

(58) Field of Classification Search
CPC ... G06T 7/74; G06T 7/75; G06T 11/60; G06T 15/20; G06T 19/006; G06T 2207/30204; G06F 3/01

See application file for complete search history.

(56) References Cited

U.S. PATENT DOCUMENTS

| 8,542,906 B1 * | 9/2013 | Persson ............. G06K 9/00671 382/103 |
| 8,847,953 B1 * | 9/2014 | Cho ..................... B29C 67/0051 345/419 |

(Continued)

FOREIGN PATENT DOCUMENTS

| JP | 2015-106255 A | 6/2015 |
| KR | 10-2015-0003591 A | 1/2015 |

(Continued)

OTHER PUBLICATIONS

Hyung-il Kim, Woontack Woo, Smartwatch-assisted robust 6-DOF hand tracker for object manipulation in HMD-based augmented reality, 2016 IEEE Symposium on 3D User Interfaces (3DUI), Mar. 2016 (Year: 2016).*

(Continued)

*Primary Examiner* — Phuc N Doan
(74) *Attorney, Agent, or Firm* — NSIP Law

(57) ABSTRACT

Provided is a method and device for displaying a virtual object that detects a main marker and a sub marker included in a reference device, identify the sub marker based on the main marker, and display a virtual object on a display device based on a relative position between the display device and the reference device calculated based on the main marker and the sub marker.

22 Claims, 10 Drawing Sheets

(51) Int. Cl.
*G06F 3/03* (2006.01)
*G06T 11/60* (2006.01)
*G06T 19/00* (2011.01)

(52) U.S. Cl.
CPC ............. *G06T 2207/30204* (2013.01); *G06T 2207/30244* (2013.01)

(56) References Cited

U.S. PATENT DOCUMENTS

| | | | | |
|---|---|---|---|---|
| 9,058,764 | B1* | 6/2015 | Persson | G09G 5/14 |
| 9,767,613 | B1* | 9/2017 | Bedikian | G06T 19/006 |
| 2007/0206832 | A1* | 9/2007 | Gordon | G06T 7/246 |
| | | | | 382/103 |
| 2011/0205242 | A1* | 8/2011 | Friesen | G06F 3/011 |
| | | | | 345/633 |
| 2012/0038637 | A1* | 2/2012 | Marks | A63F 13/10 |
| | | | | 345/419 |
| 2012/0092370 | A1* | 4/2012 | Oh | G06Q 30/0207 |
| | | | | 345/633 |
| 2012/0258796 | A1* | 10/2012 | Ohta | G06T 19/00 |
| | | | | 463/32 |
| 2013/0278635 | A1* | 10/2013 | Maggiore | G06T 19/006 |
| | | | | 345/633 |
| 2014/0063060 | A1 | 3/2014 | Maciocci et al. | |
| 2014/0168261 | A1 | 6/2014 | Margolis et al. | |
| 2014/0210947 | A1* | 7/2014 | Finn | G01C 15/002 |
| | | | | 348/46 |
| 2014/0285520 | A1* | 9/2014 | Park | G06T 19/006 |
| | | | | 345/633 |
| 2014/0368535 | A1* | 12/2014 | Salter | G02B 27/017 |
| | | | | 345/619 |
| 2014/0372944 | A1 | 12/2014 | Mulcahy et al. | |
| 2015/0221134 | A1* | 8/2015 | Koga | G06T 19/006 |
| | | | | 345/633 |
| 2015/0241705 | A1 | 8/2015 | Abovitz et al. | |
| 2015/0260505 | A1* | 9/2015 | Nagano | G06T 3/00 |
| | | | | 348/135 |
| 2016/0015470 | A1* | 1/2016 | Border | G02B 27/017 |
| | | | | 600/117 |
| 2016/0140930 | A1* | 5/2016 | Pusch | G06F 3/011 |
| | | | | 345/633 |
| 2018/0046874 | A1* | 2/2018 | Guo | G06K 9/3208 |
| 2018/0089895 | A1* | 3/2018 | Anderson | G06T 19/006 |

FOREIGN PATENT DOCUMENTS

KR 10-1550358 B1 9/2015
KR 10-2016-0018691 A 2/2016

OTHER PUBLICATIONS

Pecoulas, AR Smartwatch, URL: https://www.youtube.com/watch?v=3HJF0uxCbBk, Mar. 2015 (Year: 2015).*
Attkisson, Anna. "Magic Leap Could be Oculus Rift Killer." Tom's Guide. Tom's Guide, Dec. 6, 2016. <http://www.tomsguide.com/us/magic-leap-augmented-reality,news-19805.html> Web. Feb. 22, 2017.
M. Mohammadimasoudi, J. Beeckman, J. Shin, K. Lee, and K. Neyts, "Widely tunable chiral nematic liquid crystal optical filter with microsecond switching time," Optics express, vol. 22, pp. 19098-19107, 2014.

* cited by examiner

METHOD AND DEVICE FOR DISPLAYING VIRTUAL OBJECT

CROSS-REFERENCE TO RELATED APPLICATION(S)

This application claims the benefit under 35 USC § 119(a) of Korean Patent Application No. 10-2016-0134213 filed on Oct. 17, 2016, in the Korean Intellectual Property Office, the entire disclosure of which is incorporated herein by reference for all purposes.

BACKGROUND

1. Field

The following description relates to a method and device for displaying virtual object.

2. Description of Related Art

A virtual reality (VR) technology can extend the sensory domain and the cognitive domain of humans by realizing contents in a three-dimensional (3D) virtual reality. Augmented reality (AR) technology may be used to augment a real world environment with 3D virtual object or related information. VR or AR technology may provide a user with a relatively high level of immersion and reality based on an interaction between the user and 3D content or the 3D virtual object.

However, it may be impossible to implement the VR technology or the AR technology in devices with relatively low specification due to the processing and power requirements caused by the need to track the motion of a user and detecting features of an image for each frame in order to realize the interaction between a virtual object and the user. In addition, occlusion may occur between the virtual object and the user because there is a relatively high degree of freedom in how a user can move, and the motion may be impossible to track without synchronization between systems that control the on/off state of an active marker and a camera that photographs the motion of the user when the active marker is used. Tracking of a motion may include verifying an identity (ID) of an active marker in addition to two-dimensional (2D) space coordinates of each active marker, for example, a light emitting diode (LED).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of displaying a virtual object including detecting a main marker and a sub marker included in a reference device, identifying the sub marker based on the main marker, calculating a relative position between the reference device and a display device based on the main marker and the sub marker, and displaying the virtual object on the display device based on the relative position.

The detecting may include detecting the main marker based on an active operation of the main marker or a flickering operation of the main marker.

The detecting may include setting a reference point to track coordinates based on the main marker, and detecting the sub marker based on the reference point and a predetermined circular permutation structure.

The detecting may include detecting the main marker based on a signal of a first wavelength band corresponding to the main marker, and detecting the sub marker based on a signal of a second wavelength band corresponding to the sub marker, and the first wavelength band differs from the second wavelength band.

The identifying of the sub marker may include setting a point corresponding to the main marker as a reference point, and assigning an identity (ID) for the sub marker based on the reference point.

The calculating of the relative position may include calculating position information of the reference device, calculating position information of the display device, and calculating the relative position between the reference device and the display device based on the position information of the reference device and the position information of the display device.

The reference device may include a wearable device.

The display device may include a head mounted display (HMD).

The reference device and the display device may each include at least one of an inertial sensor, an acceleration sensor, a gyro sensor, a geomagnetic sensor, or a vision sensor.

The displaying of the virtual object may include verifying whether the relative position is within a preset range, and displaying the virtual object on the display device based on a result of calculation of a six degrees of freedom (6DoF) relative position in response to the relative position being within the preset range.

The verifying may include verifying whether the relative position is within the preset range based on a dot-product value between the position information of the reference device and the position information of the display device.

The displaying of the virtual object may include obtaining 6DoF information of the reference device, obtaining 6DoF information of the display device, and tracking coordinates for displaying the virtual object based on the 6DoF relative position based on the 6DoF information of the reference device and the 6DoF information of the display device.

The tracking of the coordinates may include matching a two-dimensional (2D) image of the virtual object to a three-dimensional (3D) model of the virtual object through a point correspondence based on a reference point corresponding to the reference marker, calculating the 6DoF relative position indicating a relative position relationship of the 3D model of the virtual object based on the 6DoF information of the reference device and the 6DoF information of the display device, and tracking the coordinates for displaying the virtual object based on the 6DoF relative position.

The displaying of the virtual object may include estimating a plane of a body portion, and displaying the virtual object on the plane of the body portion.

The displaying of the virtual object on the plane of the body portion may include displaying the virtual object at a position rotated and spaced apart from the plane of the body portion by a preset distance.

The displaying of the virtual object may include receiving information on a motion of a body portion measured by the reference device, estimating a force transmitted to an inertial system and a plane on which the virtual object is positioned based on the information on the motion of the body portion, and applying dynamics to the virtual object based on the estimated force.

The estimating of the force may include estimating a magnitude of the force and an applying direction of the force based on the information on the motion of the body portion in the inertial system set based on the main marker and the sub marker of the reference device.

The virtual object may include at least one of a virtual character, a virtual agent, or a graphic menu.

The displaying of the virtual object may include recognizing a voice of a user, and displaying the virtual object by applying a feedback in response to recognizing the voice.

In another general aspect, there is provided a display device for displaying a virtual object including a sensor configured to detect a main marker and a sub marker included in a reference device, and a processor configured to identify the sub marker based on the main marker, calculate a relative position between the reference device and the display device based on the main marker and the sub marker, and display the virtual object on the display device based on the relative position.

In another general aspect, a method of displaying a virtual object, the method includes configuring a display device to detect a main marker and a sub marker included in a reference device disposed on a body portion. The sub marker is identified based on the main marker. A relative position between the reference device and a display device is calculated based on the main marker and the sub marker. A location of a planar surface adjacent the body portion is estimated. The virtual object is displayed at the location.

The virtual object may be displayed and may trigger a response from the reference device based on a line of sight of the display device.

The display device may be disposed on a user's face and the virtual object may be displayed responsive to the user looking at the reference device.

The main marker and the sub marker may be infrared LEDs.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
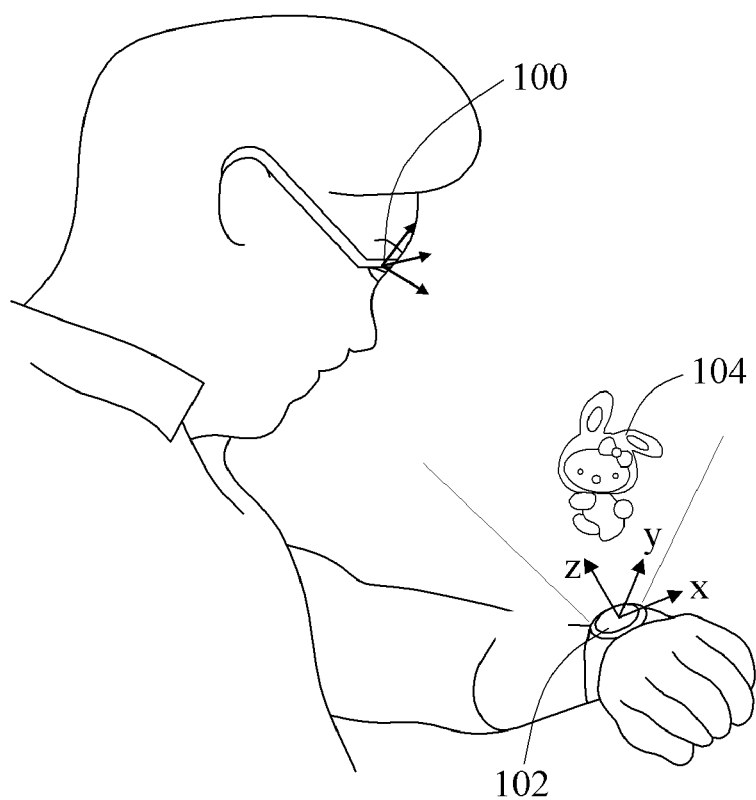
FIG. 1A illustrates an example of a system for displaying a virtual object.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

The following example embodiments may be used for determining coordinates for displaying a virtual object in a virtual reality, an augmented reality, and a complex reality in which the virtual reality and the augmented reality are combined, and displaying a virtual object based on coordinates.

Example embodiments may be implemented in various forms, for example, a smartphone, a smart home appliance, an intelligent vehicle, a wearable device, and a head mounted display (HMD). Example embodiments may be applied to display a virtual object, control a motion of the virtual object by reflecting a motion of a user, and provide an interaction through communication between the user and the virtual object in, for example, a smartphone, a mobile device, and a smart home system, and a wearable device. Example embodiments may be also applied to, for example, an intelligent vehicle system that performs an operation through communication with a virtual object or other control devices. Hereinafter, reference will now be made in detail to examples with reference to the accompanying drawings, wherein like reference numerals refer to like elements throughout.

FIG. 1A illustrates an example of a system for displaying a virtual object. The system includes a display device 100, a reference device 102, a virtual device 104, a main marker 210, and a sub marker 230.

Figure 1B:
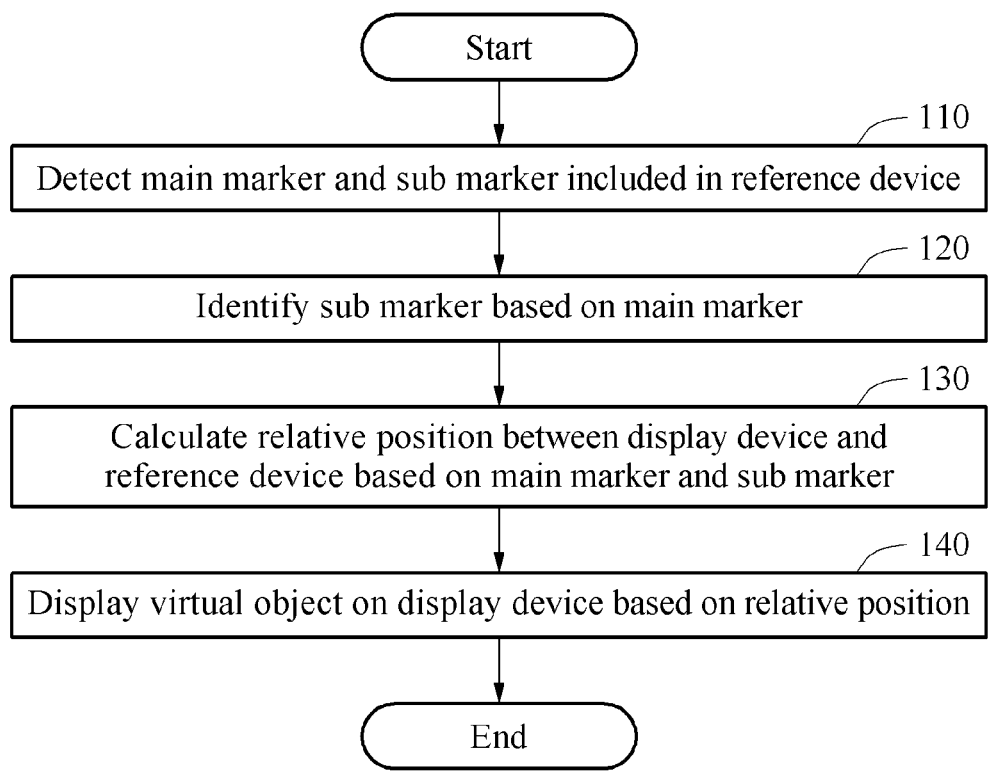
FIG. 1B is a flowchart illustrating an example of a method of displaying a virtual object.

FIG. 1B is a flowchart illustrating an example of a method of displaying a virtual object 154. Referring to FIG. 1B, a device, hereinafter also referred to as a display device 100, for displaying a virtual object 154 detects a main marker 210 and a sub marker 230 included in a reference device 102 in operation 110. The reference device 102 may be understood as a device for providing reference coordinates of a relative position between the display device 100 and the reference device 102. The reference device 102 may include a wearable device, for example, a mobile terminal, a smartphone, a smartwatch, or a smart band. The display device 100 may be a device for displaying a virtual object 104 and may include, for example, a head mounted display (HMD), a virtual reality (VR) display device 100, and an augmented reality (AR) display device 100. With an augmented reality (AR) display device 100 that is a HMD, the virtual object 104 does not necessarily have to be translucent.

The reference device 102 and the display device 100 may each include various inertial sensors (for example, an acceleration sensor, a gyro sensor, and a geomagnetic sensor) and a vision sensor.

In operation 120, the display device 100 identifies the sub marker based on the main marker 210. Detailed description of the method of detecting the main marker 210 and the sub marker, and the method of identifying the sub marker by the display device 100 will be provided with reference to FIG. 2.

In operation 130, the display device 100 calculates the relative position between the display device 100 and the reference device 102 based on the main marker 210 and the sub marker. For example, the relative position between the display device 100 and the reference device 102 may indicate relative coordinates based on inertia. Hereinafter, the relative position may be understood as including relative coordinates. Detailed description of the method of calculating the relative position by the display device 100 will be provided with reference to FIG. 3.

In operation 140, the display device 100 displays the virtual object 104 on the display device 100 based on the relative position (or the relative coordinates). The display device 100 verifies whether the relative position calculated in operation 130 is within a preset range, calculates a six degrees of freedom (6DoF) relative position based on a verification that the relative position is within the preset range, and displays the virtual object 104 on the display device 100 based on a result of the calculation. For example, the display device 100 may verify whether the relative position is within the preset range based on orientation information calculated by an inertial measurement unit (IMU) sensor or a geomagnetic sensor included in the display device 100, or orientation information calculated based on a combination of the IMU sensor and the geomagnetic sensor. Hereinafter, orientation information includes rotation information. Detailed description of the method of displaying the virtual object 104 based on a result of the verification that the relative position is within the preset range will be provided with reference to FIGS. 4 and 5. For example, the virtual object 104 may include a virtual character, a virtual agent, and/or a graphic menu.

Figure 8:
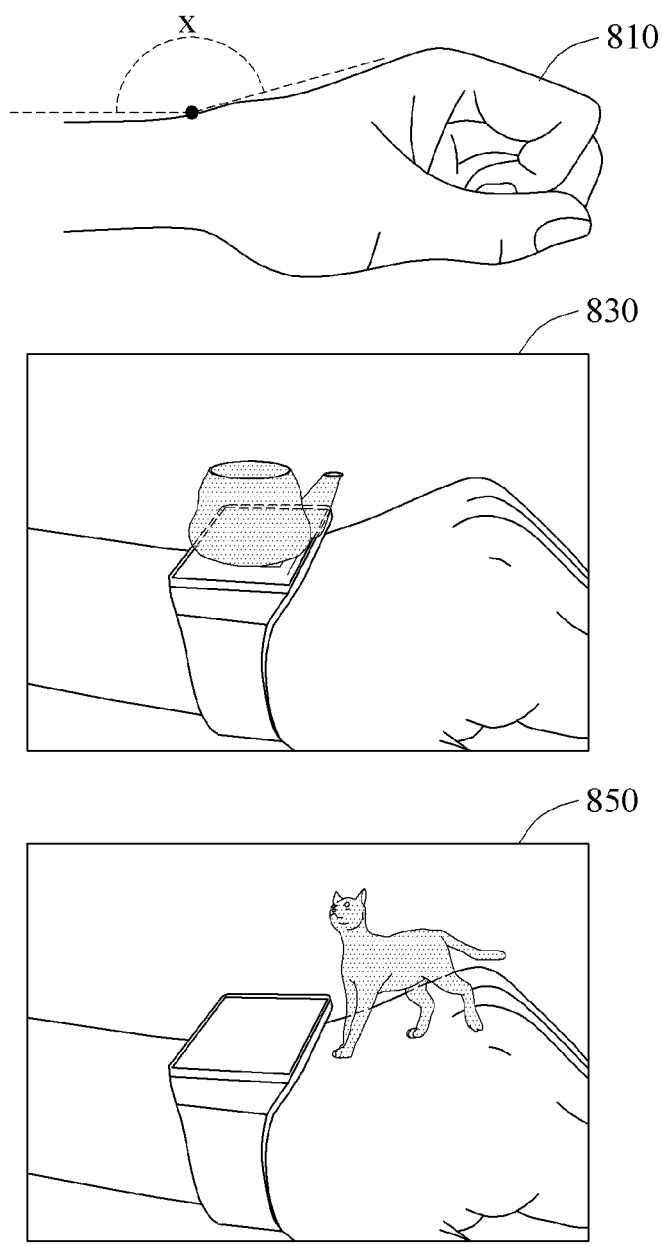
FIG. 8 illustrates another example of a method of displaying a virtual object on a display device.
Figure 9:
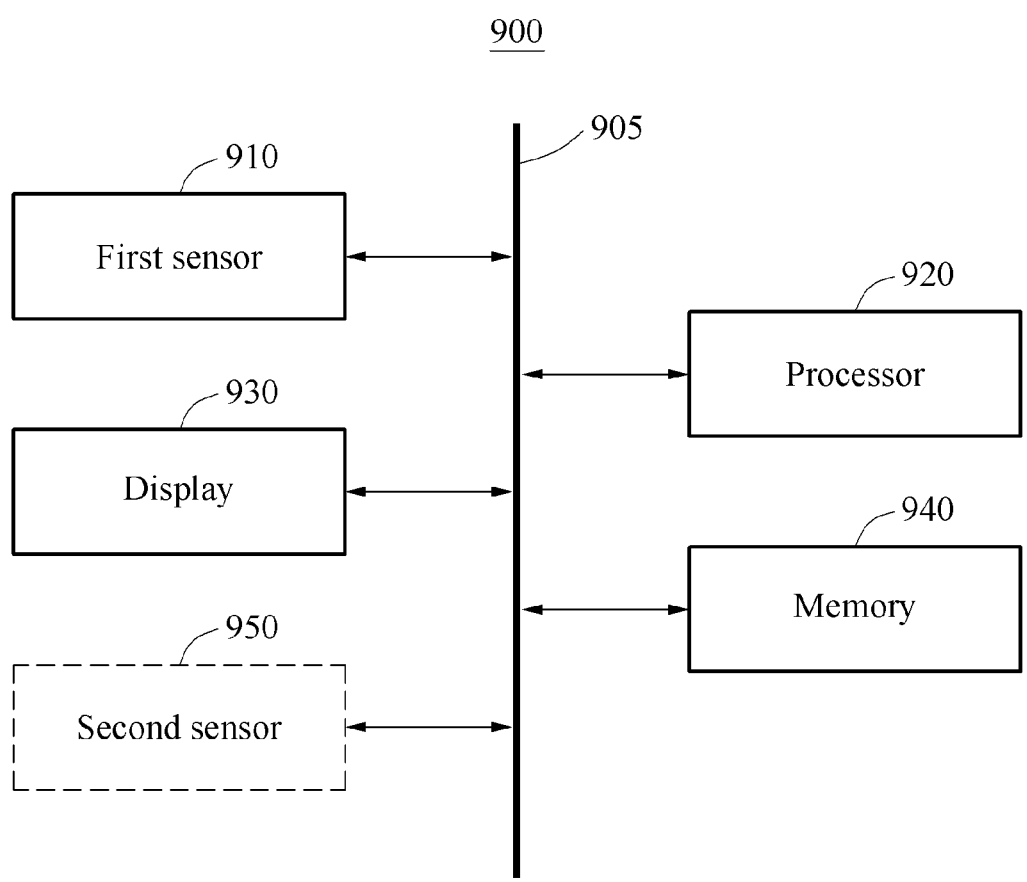
FIG. 9 is a block diagram illustrating an example of a display device.

Detailed description of various methods of displaying a virtual object 104 by the display device 100 will be provided with reference to FIGS. 8 and 9.

Figure 2:
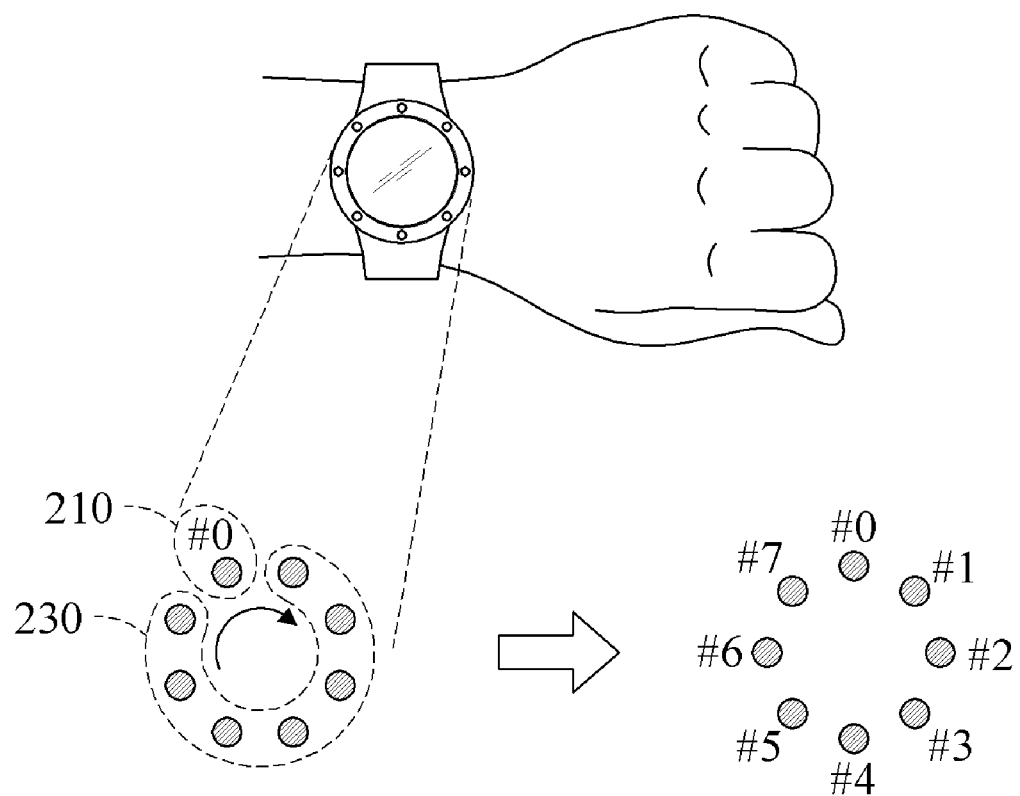
FIG. 2 illustrates an example of a method of detecting a main marker and a sub marker, and identifying the sub marker.

FIG. 2 illustrates an example of a method of detecting a main marker 210 and a sub marker 230, and identifying the sub marker 230. Referring to FIG. 2, a main marker 210 and a sub marker 230 are included in a reference device 102, for example, a smartwatch worn by a user. The sub marker 230 may be provided in a single form or a plural form. The main marker 210 and the sub marker 230 are displayed using an infrared ray (IR) light emitting diode (LED) array. The IR LED array is disposed on a bezel or a strap of a smartwatch.

The camera in the display device 100 may be used to recognize the IR LED array disposed on the reference device 102. The IR LEDs disposed on the reference device 102 may each have a different wavelength each from the other. The viewing direction with respect to the display device 100 may correspond to the line of sight of the reference device 102, which may be identical to a direction in which the smartwatch is disposed. The display device 100 sets a point corresponding to the main marker 210 as a reference point and assigns an identity (ID) to each of the sub markers 230 based on its physical location.

For example, in response to any one reference point, for example, the main marker 210, being retrieved from the IR LED disposed on the reference device 102, the display device 100 may easily detect the sub markers 230 positioned around the reference point. That is, the display device 100 may perform ID indexing on the sub marker 230 in a clockwise direction from the reference point.

For example, the closest LED, included in the IR LED array disposed on the reference device 102, to the camera in the display device 100 may be set as the main marker 210 for indexing. The main marker 210 is also referred to as an index LED.

The reference device 102 may actively operate the main marker 210 and passively operate the sub marker 230. A passive operation may be understood as an operation that allows the sub marker 230 to emit light in response to an additional signal being received. The display device 100 may detect the main marker 210 based on an active operation of the main marker 210.

The display device 100 may detect and identify the main marker 210 based on the active operation or a blinking operation of the main marker 210. The active operation may be understood as an operation that allows the main marker 210 to autonomously emit light without an additional signal. The blinking operation may be understood as an operation that allows the main marker 210 to be periodically turned on and off.

In addition, the reference device 102 may detect and identify the main marker 210 by allowing the main marker 210 to generate a signal of a first wavelength band and allowing the sub marker 230 to generate a signal of a second wavelength band. The display device 100 may detect the main marker 210 based on the signal of the first wavelength band corresponding to the main marker 210 and detect the sub marker 230 based on the signal of the second wavelength band corresponding to the sub marker 230. The display device 100 may detect or recognize IR signals of different wavelength bands using an IR-pass filter. For example, the signal of the first wavelength band may an IR signal of 850 nm, and the signal of the second wavelength band may be an IR signal of 900 nm.

The display device 100 may set the reference point to track coordinates based on the main marker 210 and detect the sub marker 230 by estimating a position of the sub marker 230 based on a predetermined structure of the reference point and an angle between numbers of a clock face. The predetermined structure may be based on a circular permutation structure. The sub marker 230 may be understood as a marker to which an ID is structurally assigned based on the ID of the main marker 210.

The display device 100 sets the point corresponding to the main marker 210 as the reference point and identifies the sub marker 230 by assigning the ID for the sub marker 230 based on the reference point. Although not illustrated in FIG. 2, the sub marker 230 may be displayed on a display of a wearable device.

In response to the ID being assigned to each of the main marker 210 and the sub marker 230 based on the aforementioned method, the display device 100 may perform 3D-2D point correspondence on the main marker 210 and the sub marker 230, and calculate a pose of a virtual object 104 using the ID. Detailed description of the method of displaying the virtual object 104 by tracking coordinates through the point correspondence will be provided with reference to FIG. 7.

Figure 3:
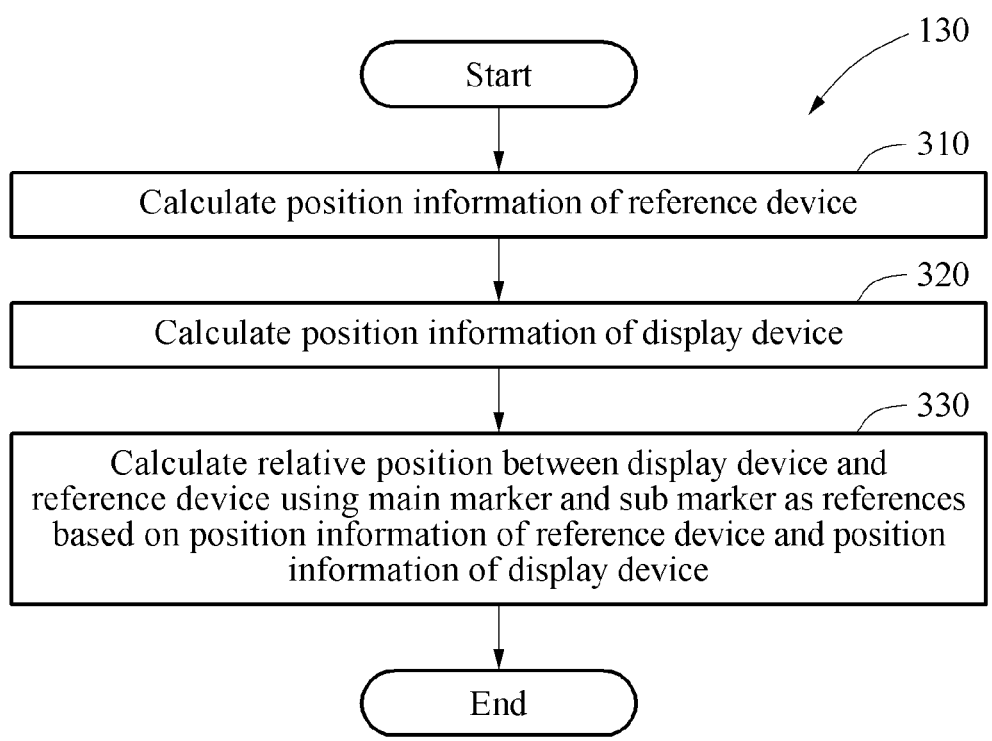
FIG. 3 is a flowchart illustrating an example of a method of calculating a relative position.

FIG. 3 is a flowchart illustrating an example of a method of calculating a relative position. Referring to FIG. 3, in operation 310, a display device 100 calculates position information of a reference device 102. For example, the display device 100 may calculate three degrees of freedom (3DoF) orientation information of a reference device 102 W using a main marker and a sub marker as references using a measurement value of an inertial sensor of the reference device 102 W. The 3DoF orientation information of the reference device 102 W may be a rotation matrix $R_W$, for example, $R_W=[\hat{X}_W\ \hat{Y}_W\ \hat{Z}_W]$. Each of $\hat{X}_W$, $\hat{Y}_W$, and $\hat{Z}_W$ is a 3×1 column vector, and $\hat{X}_W$, $\hat{Y}_W$, and $\hat{Z}_W$ indicate orientation information of an X-axis, orientation information of a Y-axis, and orientation information of a Z-axis of the reference device 102 W, respectively. In an example, the display device 100 may also calculate 6DoF position information of the reference device 102.

In operation 320, the display device 100 calculates position information of the display device 100 based on a method identical to the method used in operation 310. The display device 100 may calculate the 3DoF orientation information of a display device 100 G based on the main marker and the sub marker using the measurement value of the inertial sensor. The display device 100 may calculate the 3DoF orientation information of the display device 100 G using the main marker and the sub marker as references using the measurement value of the inertial sensor. The 3DoF orientation information of the display device 100 may be a rotation matrix $R_G$, for example, $R_G=[\hat{X}_G\ \hat{Y}_G\ \hat{Z}_G]$. Each of $\hat{X}_G$, $\hat{Y}_G$, and $\hat{Z}_G$ is a 3×1 column vector, and $\hat{X}_G$, $\hat{Y}_G$, and $\hat{Z}_G$ indicate orientation information of an X-axis, orientation information of a Y-axis, and orientation information of a Z-axis of display device 100 G, respectively.

In operation 330, the display device 100 calculates a relative position between the display device 100 and the reference device 102 using the main marker and the sub marker as the references based on the position information of the reference device 102 calculated in operation 310 and the position information of the display device 100 calculated in operation 320.

The display device 100 may display a virtual object 104 based on a result of verification that the relative position calculated in operation 330 is within a preset range.

Figure 4:
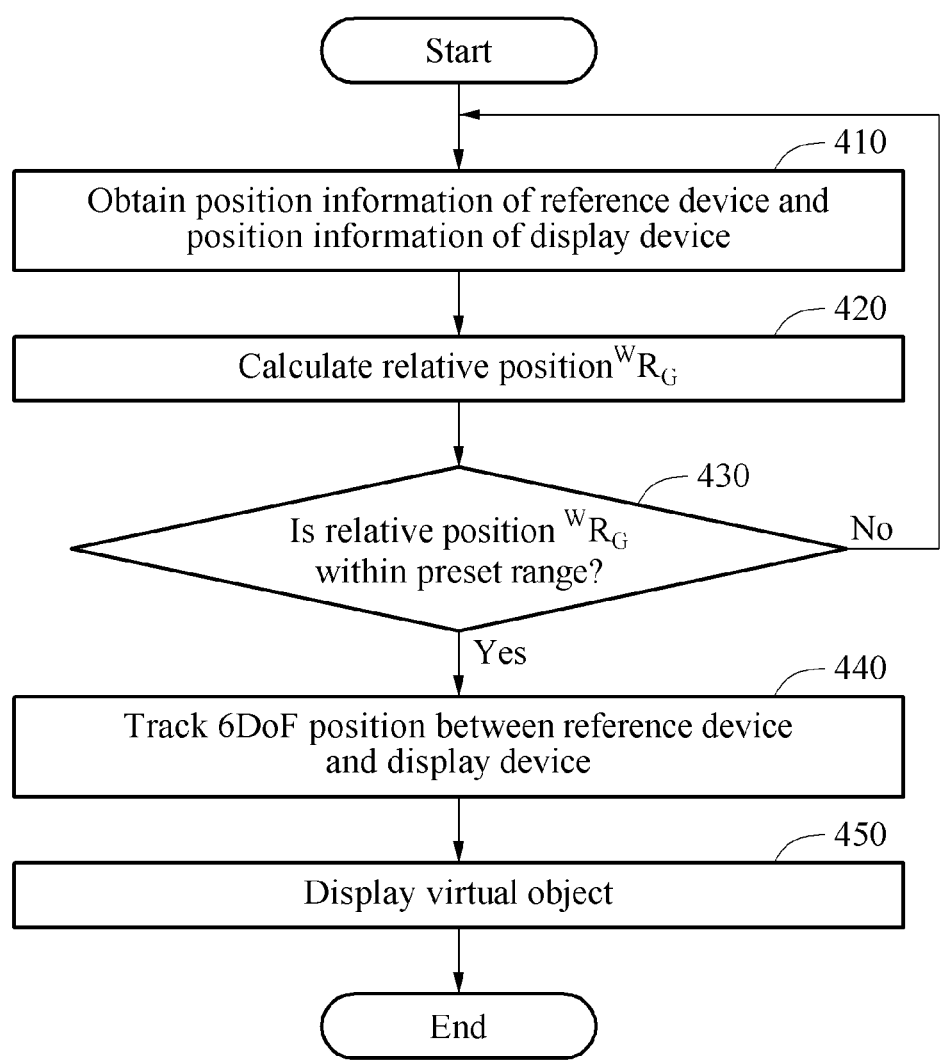
FIG. 4 is a flowchart illustrating another example of a method of displaying a virtual object.
Figure 5:
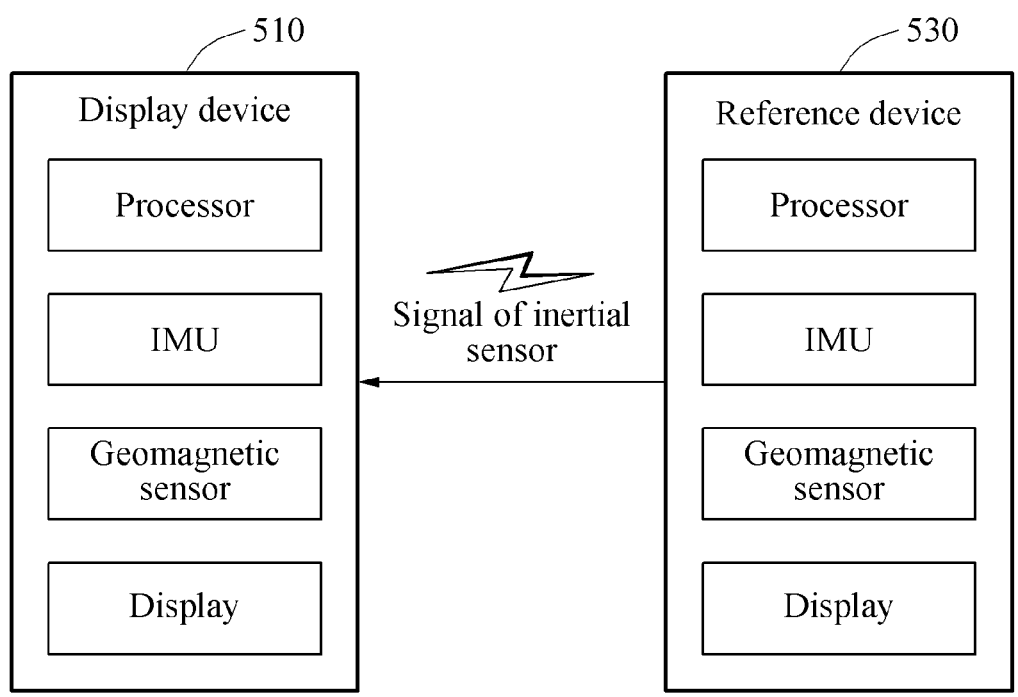
FIG. 5 is a block diagram illustrating an example of an operation between a reference device and a display device.
Figure 6:
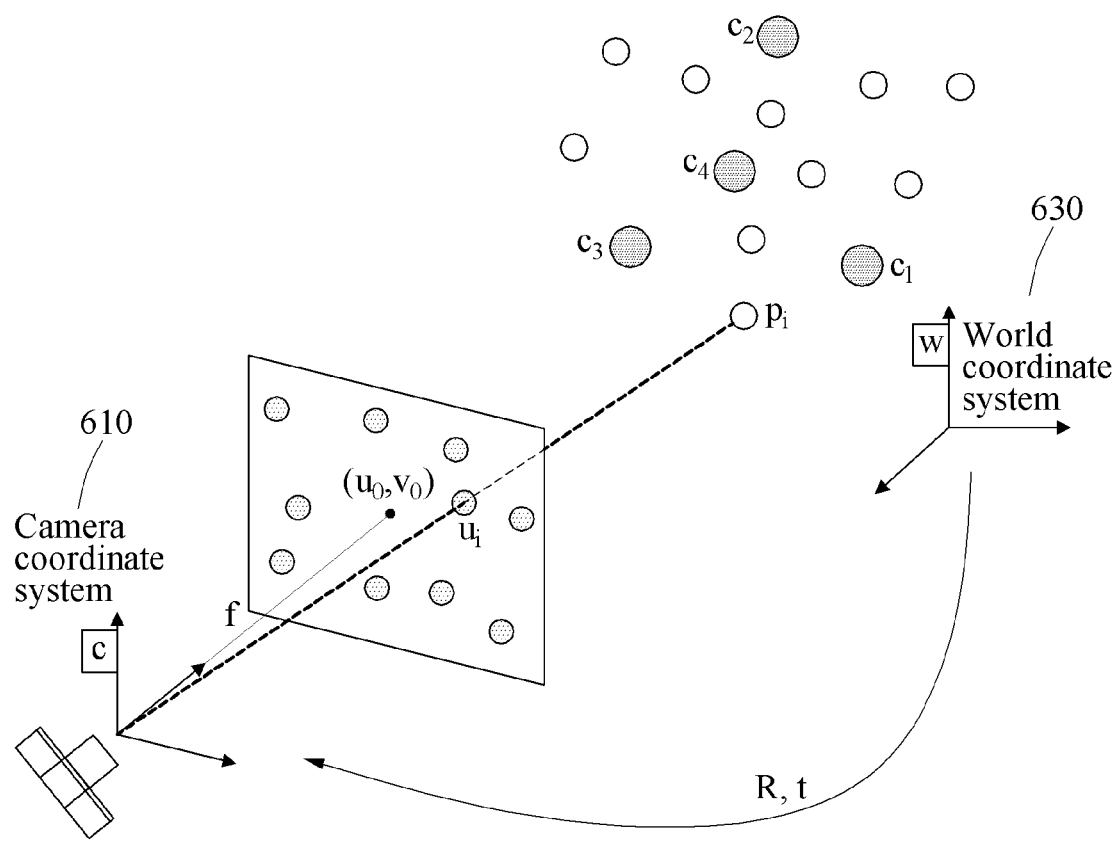
FIG. 6 illustrates an example of a method of tracking coordinates.

FIG. 4 is a flowchart illustrating another example of a method of displaying a virtual object 104. Referring to FIG. 4, in operation 410, a display device 100 obtains position information of a reference device 102 and position information of the display device 100. The position information may be, for example, three degrees of freedom (3DoF) orientation information such as $R_G$ and $R_W$ in a world coordinate system as illustrated in FIG. 6. For example, the 3DoF orientation information may be obtained from an operational frequency being less than 10 hertz (Hz). In this example, the display device 100 may obtain the 3DoF orientation information using an inertial sensor or an inertial measurement unit (IMU). The display device 100 may obtain the position information of the reference device 102 through communication with the reference device 102 using, for example, a signal of an inertial sensor as illustrated in FIG. 5.

In operation 420, the display device 100 calculates a relative position $^W R_G$ of the display device 100 based on a position of the reference device 102 based on the position information of the reference device 102 and the position information of the display device 100 obtained in operation 410. The relative position $^W R_G$ may indicate a 3DoF relative position of a display device 100 G based on a position of a reference device 102 W.

In operation 430, the display device 100 verifies whether the relative position $^W R_G$ of the display device 100 G based on the position of the reference device 102 is within a preset range based on a simple determinant. For example, the display device 100 may verify whether the relative position is within the preset range based on a vector dot-product value, for example, $d=\hat{Z}_G \cdot \hat{Z}_W$, between the position information of the reference device 102 W and the position information of the display device 100 G.

Orientation information of the display device 100 and orientation information of the reference device 102 may be calculated based on a combination of an IMU sensor and a geomagnetic sensor. A coordinate system used to calculate the orientation information may be a world coordinate system illustrated in FIG. 6.

For example, orientation information may be calculated in an Android system in a way that allows for the monitoring of the position of the device relative to the earth's frame of reference (specifically, the magnetic north pole).

The orientation angles are computed using the device's geomagnetic field sensor in combination with the device's accelerometer. Using these two hardware sensors, data is provided for the following three orientation angles:

Azimuth (degrees of rotation about the −z axis). This is the angle between the device's current compass direction and magnetic north. If the top edge of the device faces magnetic north, the azimuth is 0 degrees; if the top edge faces south, the azimuth is 180 degrees. Similarly, if the top edge faces east, the azimuth is 90 degrees, and if the top edge faces west, the azimuth is 270 degrees.

Pitch (degrees of rotation about the x axis). This is the angle between a plane parallel to the device's screen and a plane parallel to the ground. If you hold the device parallel to the ground with the bottom edge closest to you and tilt the top edge of the device toward the ground, the pitch angle becomes positive. Tilting in the opposite direction—moving the top edge of the device away from the ground—causes the pitch angle to become negative. The range of values is −180 degrees to 180 degrees.

Roll (degrees of rotation about the y axis). This is the angle between a plane perpendicular to the device's screen and a plane perpendicular to the ground. If you hold the device parallel to the ground with the bottom edge closest to you and tilt the left edge of the device toward the ground, the roll angle becomes positive. Tilting in the opposite direction—moving the right edge of the device toward the ground—causes the roll angle to become negative. The range of values is −90 degrees to 90 degrees.

The display device 100 may verify that the relative position is within the preset range in response to a dot-product value d being less than a threshold $d_{th}$. The threshold $d_{th}$ may satisfy $-1 \leq d_{th} < 0$. A dot-product value being a negative value (−) may indicate that the display device 100 and the reference device 102 face each other. An absolute value of the dot-product value may indicate a degree to which the display device 100 and the reference device 102 face each other. The dot-product value being −1 may indicate that the display device 100 and the reference device 102 completely face each other.

The preset range may be understood as a range of coordinates of the display device 100 disposed in a normal direction Z of coordinates set based on the main marker in the reference device 102. That is, the display device 100 may verify that the relative position $^{W}R_G$ is within the preset range in response to the reference device 102 being positioned in a viewing direction of a user when the user wearing the display device 100 views the reference device 102. Based on the verification that the relative position $^{W}R_G$ is not within the preset range in operation 430, operation 410 may be performed again.

A process of operations 410 through 430 may be a process of "always-on AR context verification" that verifies whether the user wearing the display device 100 is viewing the reference device 102, that is, whether the display device 100 is to display a virtual object 104.

Based on the verification that the relative position $^{W}R_G$ is within the preset range in operation 430, the display device 100 tracks a six degrees of freedom (6DoF) position between the reference device 102 and the display device 100 in operation 440.

The verification that the relative position $^{W}R_G$ is within the preset range may be understood as performing an AR function by the user.

Based on the verification that the relative position $^{W}R_G$ is within the preset range in operation 430, the display device 100 may start to perform marker tracking. The display device 100 may calculate a 6DoF distance between the reference device 102 and the display device 100 using a 3D-2D point pair obtained from a result of performing marker tracking, and display a virtual object 104 on the display device 100 based on the calculated 6DoF distance.

The display device 100 obtains 6DoF information of the reference device 102. For example, the display device 100 may obtain the 6DoF information of the reference device 102 measured using an inertial sensor or an IMU through communication with the reference device 102 as illustrated in FIG. 5. The display device 100 may obtain 6DoF information of the display device 100. The display device 100 may obtain the 6DoF information of the display device 100 using the inertial sensor or the IMU.

The display device 100 may track coordinates for displaying the virtual object 104 based on the 6DoF information of the reference device 102 and the 6DoF information of the display device 100. The display device 100 may track the coordinates using a relatively fast operational frequency, for example, a frequency greater than or equal to 10 Hz, using a vision sensor or the IMU, or a combination of the vision sensor and the IMU. Description of the method of tracking the coordinates for displaying the virtual object 104 by the display device 100 will be provided with reference to FIG. 6.

In operation 450, the display device 100 displays the virtual object 104 based on a result of tracking the 6DoF relative position.

Operations 440 and 450 may be performed to display the virtual object 104 and track a 6DoF position only when the user wearing the display device 100 views the reference device 102.

The display device 100 may display the virtual object 104 and perform calculation to track the 6DoF position only when the user views the reference device 102 by verifying the viewing direction of the user using the inertial sensor. The amount of power consumed by unnecessary calculation for tracking a position and displaying the virtual object 104 may be reduced while the display device 100 is in a standby mode.

In an example, the display device 100 allows the reference device 102 (or a screen of the display device 100) to be activated only when the user views the reference device 102 by verifying the viewing direction of the user.

Although the display device 100 may display the virtual object 104 through optical tracking with respect to a body portion of the user wearing the reference device 102, for example, a smartwatch, circumstances in which the pattern of markers included in the reference device 102 is difficult to recognize may result in the display device 100 disconnecting from the reference device 102. The disconnection may be caused by a relatively fast movement of the reference device 102, a temporary operation error, and/or a reflection caused by an illuminated light source like a fluorescent light or sunlight.

When the pattern of markers included in the reference device 102 is difficult to recognize and there is no particular change in a sensing value from an inertial sensor, corrective measures are undertaken. As a corrective measure, the display device 100 may perform 3D overlaying by correcting, for example, filtering a calculation result of optical tracking for seamlessly displaying the virtual object 104 or may perform fusion on a detecting result from sensors using an extended Kalman filter (EKF) when the tracking is stopped or an unexpected result is obtained.

FIG. 5 is a block diagram illustrating an example of an operation between a reference device 530 and a display device 510. Referring to FIG. 5, a display device 510 receives a signal of an inertial sensor from a reference device 530. The display device 510 and the reference device 530 may each include, for example, an acceleration sensor, a gyro sensor, an inertial sensor such as a geomagnetic sensor, or an inertial measurement unit (IMU), and may calculate three degrees of freedom (3DoF) information using the acceleration sensor, the gyro sensor, the inertial sensor, or the IMU.

A visual-inertial odometry function is included in the display device 510 and the reference device 530 to calculate six degrees of freedom (6DoF) position information of the display device and 6DoF position information of the reference device. The reference device 530 transmits the calculated 6DoF position information of the reference device to the display device 510.

In response to the 6DoF position information of the reference device 530 and the 6DoF position information of the display device 510 being obtained, the display device 510 may calculate, as relative position information, information on a position relative to a pose $^{W}_{G}H$ of a virtual object 104 model.

FIG. 6 illustrates an example of a method of tracking coordinates. Referring to FIG. 6, points in a two-dimensional (2D) coordinate system 610 and a world coordinate system 630 are illustrated.

A display device 100 may calculate a point correspondence between a 2D point $u_i$ and a three-dimensional (3D)

point $c_i$ based on coordinates ($u_0$, $v_0$) of a reference point corresponding to a reference marker in response to an identity (ID) being assigned to each of the reference marker and a sub marker(s). The display device 100 may calculate a six degrees of freedom (6DoF) relative position by calculating a 3D-2D relationship based on the point correspondence. Based on the calculation, the display device 100 may match (or map) coordinates of a marker determined on a 2D image of a virtual object 104 indicated based on the 2D camera coordinate system 610 to coordinates of points of a 3D model of a predetermined virtual object 104 indicated based on the world coordinate system 630.

The display device 100 may calculate a relative position relationship $^{W}H_G$ of the 3D model of the virtual object 104 based on 6DoF information of a reference device 102 and 6DoF information of the display device 100. The relative position relationship $^{W}H_G$ may indicate pose information in response to a frame of the reference device 102 referring to W and a frame of the display device 100 referring to G. The relative position relationship $^{W}H_G$ may be expressed using a 4×4 homogeneous matrix.

The display device 100 may match the 2D image of the virtual object 104 to the 3D model of the virtual object 104 through rotation or transition of coordinates. The display device 100 may track and calculate coordinates for displaying the virtual object 104 based on the calculated relative position relationship $^{W}H_G$.

As needed, the display device 100 may stably obtain the relative position relationship $^{W}H_G$ of the 3D model of the virtual object 104 by detecting incorrect matching of the 3D model using a random sample consensus scheme (RANSAC) that estimates a model parameter from original data having a relatively great measurement noise.

Figure 7:
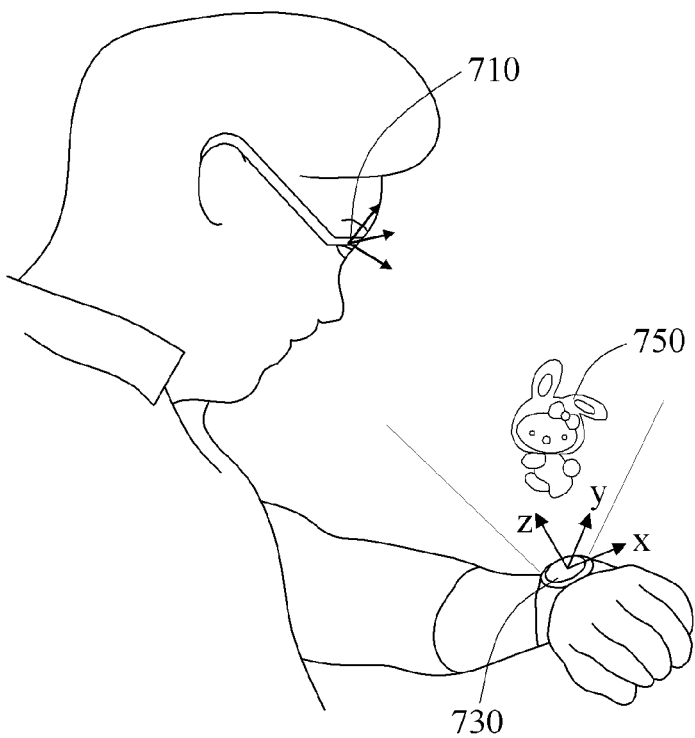
FIG. 7 illustrates an example of a method of displaying a virtual object on a display device.
Figure 7:
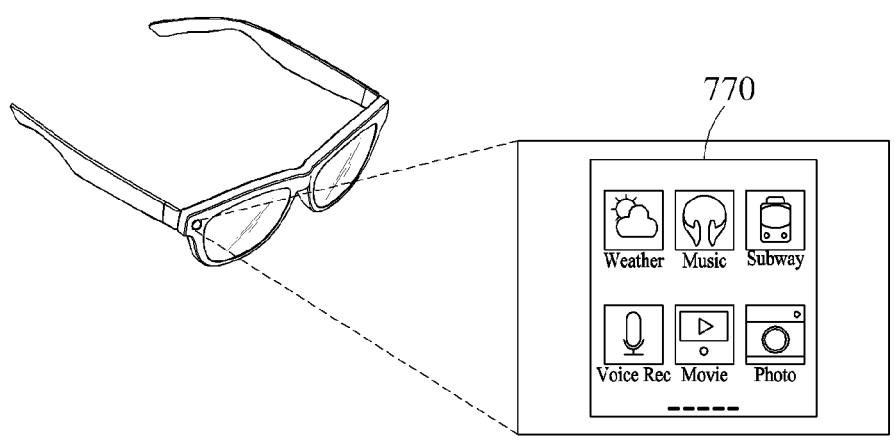

FIG. 7 illustrates an example of a method of displaying a virtual object on a display device. Referring to FIG. 7, a virtual object 750 or a graphic menu 770 is displayed in response to a user wearing a display device 710 viewing a wrist on which a reference device 730 is worn. The virtual object 750 includes, for example, a virtual character, a virtual agent, and a graphic menu.

As described above, the display device 710 may display a linked virtual object only when the user views a body portion on which the reference device 730 is worn. The display device 710 may display linked additional information on the back of the user's hand or on the reference device 730 in response to the user viewing his wrist on which the reference device 730 is worn, such that no occlusion is caused between a real world and a virtual reality (VR), or between a VR and an augmented reality (AR).

The display device 710 may display fixed information on a body portion of the user other than the fixed information displayed in a 3D space without the user viewing his own hands. The fixed information may be a menu displayed where it is easily retrieved by the user.

In an example, the display device 710 may provide convenience by immediately displaying the virtual object by detecting a viewing direction of the user without the need to perform an additional agreed upon operation that triggers a menu or to press a trigger button that triggers a VR or AR view of an environment.

FIG. 8 illustrates another example of a method of displaying a virtual object 104 on a display device 100. Referring to FIG. 8, a virtual object 104 is displayed on a body portion 810 (a hand) of a user.

The display device 100 displays the virtual object 104 at a position related to a reference device 102 or the body portion 810 of the user based on information on an angle of a body portion or a motion of a body portion of the user received from the reference device 102. For example, the reference device 102 measures an angle X of a bent wrist of the user from the body portion 810 using an infrared (IR) sensor or an ultrasonic wave distance sensor and the measured angle X is transmitted to the display device 100. The display device 100 determines where to display the virtual object 104 based on the angle X when the wrist of the user is moved.

The display device 100 estimates that a plane of a body portion, for example, a back of a hand and an arm, is extended from a plane of the reference device 102. The estimate is based on a condition in which the reference device 102 is positioned on a plane identical to that of the body portion on which the display device 100 is normally worn. The display device 100 estimates coordinates, for example, coordinates of a plane, of the body portion by calculating coordinates of the plane of the reference device 102 based on pieces of measurement information received from the display device 100. The display device 100 may display the virtual object 104 on a plane of a body portion, for example, a back of a hand, as illustrated in an image 830.

In an example, the display device 100 displays the virtual object 104 at a position spaced apart from the plane of the body portion by a preset distance as illustrated in an image 850.

The display device 100 may receive information on a motion of a body portion, for example, a wrist, measured by the reference device 102, from the reference device 102. The display device 100 may estimate a force transmitted to a plane and an inertial system based on the information on the motion of the body portion, for example, a wrist, measured by the reference device 102.

For example, the display device 100 estimates a magnitude and direction of a force produced by movement of the body portion where the reference device 102 is worn. The inertial system in the reference device 102 provides information based on the main marker and the sub marker in the reference device 102. The display device 100 may estimate the magnitude of the force and the applying direction of the force based on the information produced by the motion of the body portion in which the inertial system is disposed for determining a relative position between the main marker and the sub marker of the reference device 102.

The display device 100 may assign a physical quantity (for example, a mass m, a spring constant k, and a damping constant c) to the virtual object 104 based on information associated with a force (for example, a magnitude of a force and an applying direction of the force). The physical quantity assigned to the virtual object 104 may be determined based on a well-known mass (m)-spring(k)-damper(c) model.

The force transmitted to the inertial system and the plane on which the virtual object 104 is positioned may be, for example, a ground reaction force caused by a reaction to a force applied to the Earth by an object. The ground reaction force may have an identical magnitude and an opposite direction of a force applied by the Earth.

The display device 100 applies dynamics to the virtual object 104 based on the estimated force. For example, in response to the user moving extending the back of a hand outwards, the force applied to the plane of the back of a hand may be applied in a direction of a 90-degree angle on the plane. The display device 100 may display clothing, hair, and each joint portion of a virtual character by tilting angles of the clothing, the hair, and each joint portion of the virtual character or decreasing the angles to be less than 90 degrees based on the estimated force.

The display device 100 may control a motion of the virtual object 104 based on a motion in the inertial system, for example, a coordinate system, set based on the main marker and the sub marker of the reference device 102.

For example, the display device 100 may set a gravity value $z_{final}$ aligned based on a coordinate system using Equation 1.

$$z_{final} = \alpha z_{ref} + (1-\alpha) z_{gravity}\ 0 <= \alpha < 1 \qquad \text{[Equation 1]}$$

In Equation 1, $z_{ref}$ denotes a gravity value based on an inertial system, for example, a coordinate system, of the reference device 102, and $z_{gravity}$ denotes a gravity value based on an inertial system, for example, a coordinate system of the display device 100. $\alpha$ denotes a weight.

Equation 1 may be used to determine a direction of a gravity defined based on a Z-axis of the reference device 102, for example, a wearable device, and an actual direction of a gravity of the Earth.

In an example, the display device 100 may display a voice agent having a shape. The display device 100 may display the virtual object 104 to be moved in response to a voice of the user.

The display device 100 may recognize the voice of the user and display the virtual object 104 responsive to the user's voice. For example, in response to recognizing the voice of the user different functions may be undertaken including providing content responsive to the voice of the user or voice recognition rate.

The user may execute a menu using the reference device 102, for example, a wearable device or a mobile phone, in response to the reference device 102 recognizing the voice, while viewing the virtual object 104 displayed by the display device 100.

In an example, the display device 100 may display, through the virtual object 104, a feedback response to the command or request spoken and understood by the reference device 102. For example, when the voice of the user is inaccurately received or the voice recognition rate is less than a preset reference value in the voice recognition unit, the display device 100 may display the virtual object 104 making various gestures such as shaking its head side to side or waving its hand side to side.

Thus, the feedback response of a predetermined operation performed by the reference device 102 may be displayed through the virtual object 104 and thus, the user may experience a natural and fun interaction with the virtual object 104 compared to when the user speaks to the air without the virtual object 104 being present.

FIG. 9 is a block diagram illustrating an example of a display device 100. Referring to FIG. 9, a display device 900 includes a first sensor 910, a processor 920, a display 930, and a memory 940. The display device 900 may further include a second sensor 950. The first sensor 910, the processor 920, the display 930, the memory 940, and the second sensor 950 may communicate with each other via a communication bus 905.

The first sensor 910 detects a main marker and a sub marker included in a reference device 102. The first sensor may be a vision sensor including an infrared (IR) sensor.

The processor 920 identifies the sub marker based on the main marker. The processor 920 calculates a relative position between the display device 900 and the reference device 102 based on the main marker and the sub marker. The processor 920 displays a virtual object 104 on the display 930 based on the relative position. In addition, the processor 920 may perform at least one of methods described with reference to FIGS. 1 through 8.

The processor 920 executes a program in parallel or in series, and controls an updating device. A program code to be executed by the processor 920 may be stored in the memory 940.

The display 930 displays the virtual object 104 based on a control signal of the processor 920.

The memory 940 stores the relative position calculated by the processor 920. The memory 940 stores a two-dimensional (2D) image of the virtual object 104 and a three-dimensional (3D) model of the virtual object 104. The memory 940 may be a volatile memory or a non-volatile memory.

The second sensor 950 detects a motion of a body portion. The second sensor 950 may be an inertial sensor.

The processor 920 estimates a planar body portion adjacent to the location where reference device 102 is worn and positioned. The processor 920 estimates the force applied to the planar body portion based on the motion of the body portion and modifies the dynamics of the virtual object 104 based on the estimated force.

The image display apparatus described herein may be implemented using a liquid crystal display (LCD), a light-emitting diode (LED) display, a plasma display panel (PDP), a screen, a terminal, or any other type of display configured to display the images and information to be displayed by the image display apparatus. A screen may be a physical structure that includes one or more hardware components that provide the ability to render a user interface and receive user input. The screen may include any combination of a display region, a gesture capture region, a touch-sensitive display, and a configurable area. The screen may be part of an apparatus, or may be an external peripheral device that is attachable to and detachable from the apparatus. The display may be a single-screen display or a multi-screen display. A single physical screen may include multiple displays that are managed as separate logical displays permitting different content to be displayed on separate displays even though they are part of the same physical screen.

The user interface may provide the capability of inputting and outputting information regarding a user and an image. The user interface may include a network module for connecting to a network and a universal serial bus (USB) host module for forming a data transfer channel with a mobile storage medium. In addition, the user interface may include one or more input/output devices, such as a mouse, a keyboard, a touch screen, a monitor, a speaker, a screen, or a software module for controlling the input/output device.

The methods in FIGS. 1B, 2-4, and 6-8 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1B, 2-4, and 6-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As a non-exhaustive example only, a terminal/device/unit as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of displaying a virtual object, the method comprising:
   detecting, from a reference device, a first marker type and a second marker type of a plurality of markers included in a predetermined structure, the reference device being a wearable device;
   identifying, based on a signal of a first wavelength band, a main marker as the first marker type, from among the plurality of markers, based on an active operation or a flickering operation of the main marker;
   identifying, based on a second wavelength band, a plurality of sub markers as the second marker type, wherein the identifying of the plurality of sub markers comprises:
      setting the main marker as a reference point of the predetermined structure; and
      identifying the plurality of sub markers based on the reference point and a predetermined permutation direction with respect to the predetermined structure;
   calculating a relative position between the reference device and a display device based on the main marker and the sub markers; and
   displaying the virtual object on the display device based on the relative position,
   wherein the second wavelength band is different from the first wavelength band.

2. The method of claim 1, wherein the identifying of the plurality of sub markers comprises:
   setting a point corresponding to the main marker as the reference point; and
   assigning an identity (ID) to each of the plurality of sub markers based on the reference point.

3. The method of claim 1, wherein the calculating of the relative position comprises:
   calculating position information of the reference device;
   calculating position information of the display device; and
   calculating the relative position between the reference device and the display device based on the position information of the reference device and the position information of the display device.

4. The method of claim 1, wherein the display device includes a head mounted display (HMD).

5. The method of claim 1, wherein the reference device and the display device each includes at least one of an inertial sensor, an acceleration sensor, a gyro sensor, a geomagnetic sensor, or a vision sensor.

6. The method of claim 3, wherein the displaying of the virtual object comprises:
   verifying whether the relative position is within a proximate range of the reference device; and
   displaying the virtual object on the display device based on a result of calculation of a six degrees of freedom (6DoF) relative position in response to the relative position being within the preset range.

7. The method of claim 6, wherein the verifying comprises verifying whether the relative position is within the preset range based on a dot-product value between the position information of the reference device and the position information of the display device.

8. The method of claim 6, wherein the displaying of the virtual object comprises:
   obtaining 6DoF information of the reference device;
   obtaining 6DoF information of the display device; and
   tracking coordinates to display the virtual object based on the 6DoF relative position based on the 6DoF information of the reference device and the 6DoF information of the display device.

9. The method of claim 8, wherein the tracking of the coordinates comprises:
   matching a two-dimensional (2D) image of the virtual object to a three-dimensional (3D) model of the virtual object through a point correspondence based on the reference point corresponding to the main marker;
   calculating the 6DoF relative position indicating a relative position relationship of the 3D model of the virtual object based on the 6DoF information of the reference device and the 6DoF information of the display device; and
   tracking the coordinates to display the virtual object based on the 6DoF relative position.

10. The method of claim 1, wherein the displaying of the virtual object comprises:
    estimating a plane of a body portion; and
    displaying the virtual object on the plane of the body portion.

11. The method of claim 10, wherein the displaying of the virtual object on the plane of the body portion comprises displaying the virtual object at a position rotated and spaced apart from the plane of the body portion by a proximate distance to the reference device.

12. The method of claim 1, wherein the displaying of the virtual object comprises:
    receiving information on a motion of a body portion measured by the reference device;
    estimating a force transmitted to an inertial system and a plane on which the virtual object is positioned based on the information on the motion of the body portion; and
    applying dynamics to the virtual object based on the estimated force.

13. The method of claim 12, wherein the estimating of the force comprises estimating a magnitude of the force and an applying direction of the force based on the information on the motion of the body portion in the inertial system set based on the main marker and the plurality of sub markers of the reference device.

14. The method of claim 1, wherein the virtual object includes any one or any combination of any two or more of a virtual character, a virtual agent, and a graphic menu.

15. The method of claim 1, wherein the displaying of the virtual object comprises:
    recognizing a voice of a user; and
    displaying the virtual object by applying a feedback in response to recognizing the voice.

16. A non-transitory computer-readable storage medium storing instructions that, when executed by a processor, cause the processor to perform computing hardware to perform the method of claim 1.

17. A display device for displaying a virtual object, the display device comprising:
    a sensor configured to detect, from a reference device, a first marker type and a second marker type of a plurality of markers included in a predetermined structure, the reference device being a wearable device;

identify, based on a signal of a first wavelength band, a main marker as the first marker type, from among the plurality of markers, based on an active operation or a flickering operation of the main marker; and identify, based on a second wavelength band, a plurality of sub markers as the second marker type, wherein the identifying of the plurality of sub markers comprises:

setting the main marker as a reference point of the predetermined structure; and identifying the plurality of sub markers based on the reference point and a predetermined permutation direction with respect to the predetermined structure; and a processor configured to calculate a relative position between the reference device and the display device based on the main marker and the plurality of sub markers, and display the virtual object on the display device based on the relative position, wherein the second wavelength band is different from the first wavelength band.

18. A method of displaying a virtual object, the method comprising:

configuring a display device to detect, from a reference device disposed on a body portion, a first marker type and a second marker type of a plurality of markers included in a predetermined structure, the reference device being a wearable device;

identifying, based on a signal of a first wavelength band, a main marker as the first marker type, from among the plurality of markers, based on an active operation or a flickering operation of the main marker;

identifying, based on a second wavelength band, a plurality of sub markers as the second marker type, wherein the identifying of the plurality of sub markers comprises:

setting the main marker as a reference point of the predetermined structure; and identifying the plurality of sub markers based on the reference point and a predetermined permutation direction with respect to the predetermined structure;

calculating a relative position between the reference device and the display device based on the main marker and the plurality of sub markers; and displaying the virtual object on the display device based on the relative position, wherein the second wavelength band is different from the first wavelength band.

19. The method of claim 18, wherein the virtual object is displayed and triggers a response from the reference device based on a line of sight of the display device.

20. The method of claim 18, wherein the display device is disposed on a user's face and the virtual object is displayed responsive to the user looking at the reference device.

21. The method of claim 20, wherein the main marker and the plurality of sub markers are infrared light emitting diodes.

22. The method of claim 1, wherein in the first configuration, the main marker emits additional light without receiving additional signals, and in the second configuration, the plurality of sub markers emit additional light in response to receiving an additional signal.

* * * * *